(12) United States Patent
Ramm

(10) Patent No.: US 9,835,040 B2
(45) Date of Patent: Dec. 5, 2017

(54) TURBOMACHINE

(71) Applicant: MTU Aero Engines AG, Munich (DE)

(72) Inventor: Guenter Ramm, Eichenau (DE)

(73) Assignee: MTU Aero Engines AG, Munich (DE)

( * ) Notice: Subject to any disclaimer, the term of this patent is extended or adjusted under 35 U.S.C. 154(b) by 492 days.

(21) Appl. No.: 14/508,709

(22) Filed: Oct. 7, 2014

(65) Prior Publication Data
US 2015/0098809 A1    Apr. 9, 2015

(30) Foreign Application Priority Data
Oct. 8, 2013  (DE) ........................ 10 2013 220 276

(51) Int. Cl.
*F01D 11/02* (2006.01)
*F01D 11/12* (2006.01)
*F01D 11/08* (2006.01)

(52) U.S. Cl.
CPC .............. *F01D 11/12* (2013.01); *F01D 11/02* (2013.01); *F01D 11/08* (2013.01); *Y02T 50/671* (2013.01)

(58) Field of Classification Search
CPC .......... F01D 11/12; F01D 11/02; F01D 11/08; F01D 11/00
USPC ..................................................... 415/173.6
See application file for complete search history.

(56) References Cited

U.S. PATENT DOCUMENTS

| | | | | |
|---|---|---|---|---|
| 1,999,739 A | * | 4/1935 | Rasmussen | ............. F01D 11/02 415/170.1 |
| 3,730,640 A | | 5/1973 | Rice et al. | |
| 4,218,189 A | * | 8/1980 | Pask | ........................ F01D 5/225 277/420 |
| 4,361,213 A | * | 11/1982 | Landis, Jr. | .............. F01D 11/02 188/378 |
| 4,645,217 A | * | 2/1987 | Honeycutt, Jr. | ....... F01D 11/005 277/555 |
| 5,201,846 A | * | 4/1993 | Sweeney | ................... F01D 9/04 415/170.1 |
| 5,222,742 A | * | 6/1993 | Roberts | ................ F16J 15/4476 277/420 |
| 5,328,328 A | | 7/1994 | Charbonnel et al. | |
| 5,333,995 A | * | 8/1994 | Jacobs | .................. F01D 25/246 415/173.1 |

(Continued)

FOREIGN PATENT DOCUMENTS

| | | |
|---|---|---|
| CH | 103052 A | 1/1924 |
| DE | 69300621 T2 | 5/1996 |

(Continued)

*Primary Examiner* — Aaron R Eastman
(74) *Attorney, Agent, or Firm* — Davidson, Davidson & Kappel, LLC

(57) ABSTRACT

A turbomachine is described, which includes an annular space seal for at least reducing a fluid exchange between an annular space, through which a main stream flows, and at least one cavity situated radially on the inside and/or radially on the outside of the annular space, the annular space seal having a plurality of sheet-like elastic elements, which are oriented in the radial direction of the turbomachine and in the flow direction of a main stream flowing through the particular guide blade row, and thereby acting as a protective device for the rotor and/or stator during a relative axial displacement with respect to the stator in addition to providing an improved cavity coverage.

12 Claims, 4 Drawing Sheets

(56) References Cited

U.S. PATENT DOCUMENTS

| | | | |
|---|---|---|---|
| 7,540,709 B1* | 6/2009 | Ebert | F04D 29/083 |
| | | | 415/173.7 |
| 2005/0163608 A1* | 7/2005 | Okita | F01D 5/082 |
| | | | 415/115 |
| 2008/0118350 A1 | 5/2008 | Feeny et al. | |
| 2011/0150640 A1* | 6/2011 | Tiemann | F01D 5/3015 |
| | | | 415/191 |
| 2014/0193243 A1* | 7/2014 | Nallam | F01D 11/02 |
| | | | 415/170.1 |
| 2014/0363279 A1* | 12/2014 | Wondrasek | F01D 11/006 |
| | | | 415/173.1 |
| 2015/0040567 A1* | 2/2015 | Lu | F01D 11/001 |
| | | | 60/722 |

FOREIGN PATENT DOCUMENTS

| | | |
|---|---|---|
| DE | 10330084 A1 | 3/2004 |
| DE | 102007054926 A1 | 6/2008 |
| EP | 1914389 A1 | 4/2008 |
| JP | 2005127198 | 5/2005 |
| WO | WO9942704 A1 | 8/1999 |
| WO | WO2007028353 | 3/2007 |

* cited by examiner

Section A-A

Detail B

TURBOMACHINE

This claims the benefit of German Patent Application DE 10 2013 220 276.8, filed Oct. 8, 2013 and hereby incorporated by reference herein.

The present invention relates to a turbomachine which includes an annular space seal.

BACKGROUND

Turbomachines, such as stationary gas turbines or aircraft engines, are conventionally provided with annular space seals between adjacent guide blade rows and moving blade rows for the purpose of at least reducing a fluid exchange between an annular space through which a main stream flows and cavities situated radially on the inside and outside of the annular space. An annular space seal of this type is shown, for example, in U.S. Pat. No. 3,730,640 A. This known annular space seal has a plurality of slotted elastic sheets, which extend from a rotor web in the axial direction of the turbomachine, downstream from a moving blade row, and thus cover a radially inner cavity in the direction of the annular space. A disadvantage of this annular space seal is that it is situated on the rotor side, whereby it contributes to an increase in the weight of the rotor and affects the moving behavior of the rotor.

SUMMARY OF THE INVENTION

It is an object of the present invention to provide a turbomachine which has an alternative annular space seal which eliminates the aforementioned disadvantages.

The present invention provides a turbomachine, in particular an aircraft engine, that has an annular space seal for the purpose of at least reducing a fluid exchange between an annular space through which a main stream flows and at least one cavity which is situated radially on the inside and/or radially on the outside of the annular space. The annular space seal has a plurality of sheet-like elastic elements, which, according to the present invention, extend over shroud edges of the guide blade row in the axial direction of the turbomachine, the elastic elements being oriented in the radial direction of the turbomachine and in the flow direction of the main stream flowing through the particular guide blade row.

Due to the arrangement of the elastic elements on at least one guide blade row, the annular space seal is fastened on the stator side and does not add its own weight to the rotor weight. The annular space seal does not result in an increase in the rotor weight and also does not have to be taken into account in the moving behavior of the rotor. Due to the orientation of the elastic elements in the radial direction and in the flow direction, on the one hand, a high coverage of the at least one cavity is achieved. In addition, a disturbance of the main flow is prevented or at least minimized due to the fact that the elastic elements are oriented in their particular locations in the direction of the main stream or the main flow. Due to the improved coverage, an efficiency gain occurs, which results in a lower fuel consumption. On the other hand, the at least one annular space seal may act as a protective device during an axial relative displacement of the rotor with respect to the stator, due to the orientation of its elastic elements set in the axial direction. If, for example, the rotor is namely displaced relative to the stator by an absolute amount, following a pump stroke, the moving blades opposite the elastic elements may run into the elastic elements, starting at a certain axial displacement. The elastic elements are elastically deformed, and the moving blades remain undamaged. Since no damage occurs during the impact, the elastic elements may continue to be guided over the cavity as conventional annular space seals, whereby the coverage of the particular cavity is further improved. During a displacement of the rotor back to its axial starting position, the elastic elements resume their original shape. The annular space seal according to the present invention thus has a dual function: firstly, a sealing function, and secondly a protection function.

To achieve a uniform deflection of the main stream in the shroud area as well as a uniform coverage of the at least one cavity, it is advantageous if the elastic elements are spaced evenly apart over the guide blade row, viewed in the circumferential direction of the turbomachine.

To prevent a disturbing swirl of the shroud-side main flow during the outflow, it is advantageous if the elastic elements each terminate flush with a shroud inner side radially delimiting the annular space in the radial direction.

To avoid a disturbing swirl of sealing air in the cavity, the elastic elements may each terminate flush with a shroud outer side delimiting the cavity, viewed in the radial direction.

In an attachment which is technically easy to implement, the elastic elements are each inserted into a corresponding indentation of the shrouds via a holding section. To secure the elastic elements on the shrouds, they may be integrally secured against falling out of the indentations, for example with the aid of soldering, gluing, welding and the like.

In one exemplary embodiment, the elastic elements with their active sections terminate gaplessly with the shrouds. The gapless arrangement facilitates easy assembly.

In one alternative exemplary embodiment, the elastic elements with their active sections are each spaced apart by a gap from the shrouds. The gap facilitates a greater coverage, since the elastic elements are able to bend to a greater degree in the circumferential direction.

An annular space seal is preferably situated on the shroud leading edges and on the shroud trailing edges of a guide blade row. This provides an optimum sealing of a cavity in the flow direction of the main stream in front of and behind the particular guide blade row. At the same time, axial relative displacements of the rotor in the flow direction and in the opposite direction may thus be "absorbed" by the annular space seal or its elastic elements.

To reliably prevent damage to the moving blade of a moving blade row opposite the elastic elements, it is advantageous if the moving blades have rubbing areas for rubbing against the elastic elements. In one exemplary embodiment, these areas are located in a transitional area between an inner platform and a blade element of the particular moving blade. The rubbing areas may also be treated separately, for example surface-hardened.

If the annular space seal is also situated on the guide blades on the outer shroud side, it is advantageous, for the purpose of reliably avoiding damage to the opposite moving blades, if the latter have rubbing areas for rubbing against the elastic elements, which are designed as radial, web-like projections of an outer platform edge.

BRIEF DESCRIPTION OF THE DRAWINGS

A preferred exemplary embodiment of the present invention is explained in greater detail below on the basis of highly simplified schematic drawings.

DETAILED DESCRIPTION

Figure 1:
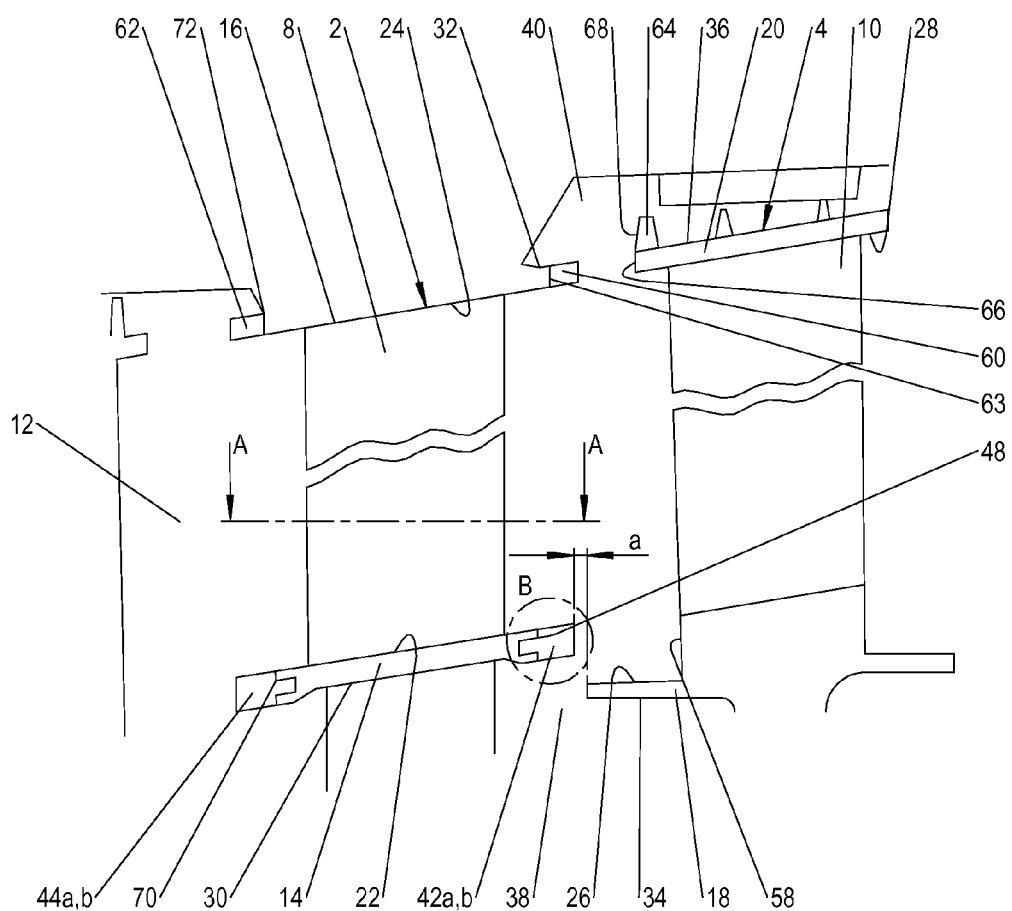
FIG. 1 shows a longitudinal section of one exemplary embodiment of a turbomachine according to the present invention, including mounted annular space seals.

FIG. 1 shows a longitudinal section of an area of one exemplary embodiment of a turbomachine 1 according to the present invention. Turbomachine 1 is, for example, a gas turbine and, in particular, an aircraft engine. Turbomachine 1 has a stator, which includes a plurality of guide blade rows 2 situated consecutively in the axial direction of turbomachine 1. A rotor, which is rotatable around an axial axis of the turbomachine and which has a plurality of moving blade rows 4 which are alternately situated with guide blade rows 2, viewed in the axial direction, is supported in the stator. Blade rows 2, 4 each include a plurality of blades, situated next to each other in the circumferential direction of the turbomachine, which each have one blade element 8, 10. Blade elements 8, 10 are each situated in an annular space 12, which extends approximately in the axial direction and through which a main stream flows. In the exemplary embodiment illustrated herein, the main stream flows through annular space 12 from left to right.

Annular space 12 is delimited in the radial direction by inner shrouds 14 and outer shrouds 16 of the guide blades and by inner platforms 18 and outer platforms 20 of the moving blades. In particular, annular space 12 is delimited by shroud inner surfaces 22, 24 and by platform inner surfaces 26, 28.

In the exemplary embodiment illustrated herein, shroud outer surfaces 30, 32 facing away from inner surfaces 22, 24, 26, 28 as well as platform outer surfaces 34, 36 delimit an inner cavity 38 situated radially on the inside with respect to annular space 12 and an outer cavity 40 situated radially on the outside with respect to annular space 12.

Figure 5:
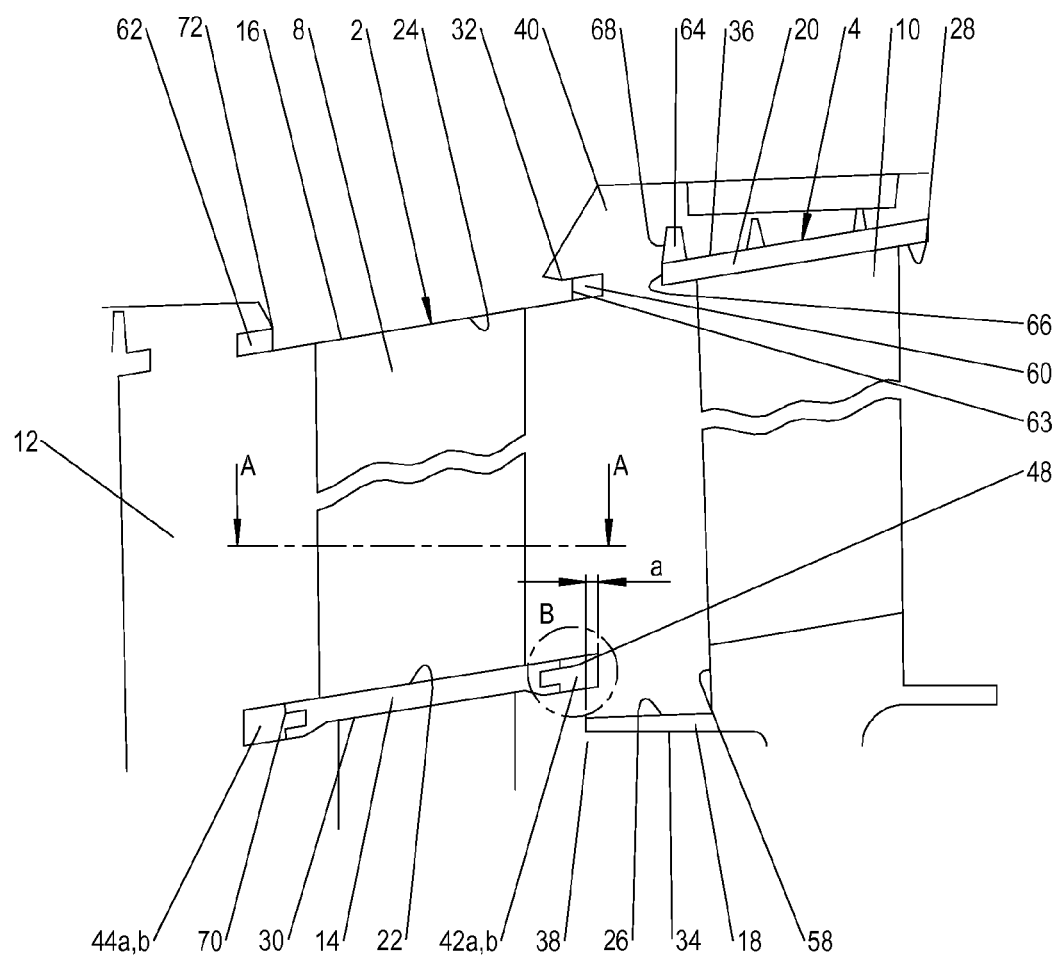
FIG. 5 shows a longitudinal section of an area of one alternative exemplary embodiment of a turbomachine according to the present invention, including mounted annular space seals.

To prevent or at least to reduce a fluid exchange between the main flow in annular space 12 and a coolant flow, for example in inner cavity 38, turbomachine 1 has an annular space seal, as indicated on the basis of guide blade row 2 and rear or downstream moving blade row 4 in FIG. 1. The annular space seal has at least one plurality of elastic elements 42a, 42b, which extend over a trailing shroud inner edge 48 in the axial direction of the turbomachine. Elastic elements 42a, 42b are situated radially on the outside of inner platform 18 and, in the exemplary embodiment illustrated herein, are spaced apart from inner platforms 18 by a positive axial gap a. As outlined in FIG. 5, axial gap a may also be negative, due to an axial overlapping of inner platform 18 by elastic elements 42a, 42b.

Figure 2:
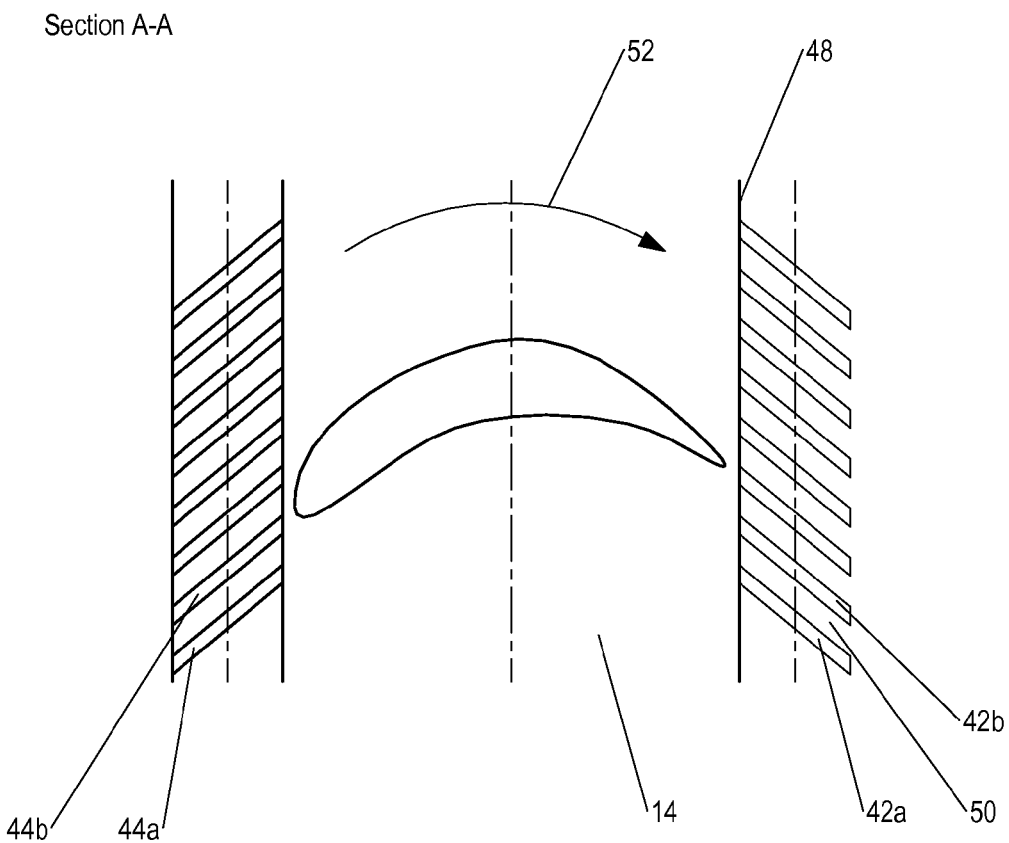
FIG. 2 shows a top view of the radially inner annular space seals from FIG. 1.

As shown in the top view according to FIG. 2, elastic elements 42a, 42b each have a sheet-like shape or a sheet-like active section 49, and are oriented perpendicularly in the radial direction of the turbomachine, with respect to particular inner shroud 14. In other words, in the view according to FIG. 2, a particular narrow side of platform-like elastic elements 42a, 42b is apparent, while in the views according to FIGS. 1 and 3, a larger flat side of elastic elements 42a, 42b opposite the narrow side is apparent. They are spaced evenly apart in the circumferential direction of guide blade row 2, so that a plurality of channels 50 is provided between them or between their sheet-like active sections 49. Viewed in the circumferential direction, guide blade row 2 has, so to speak, a rear elastic element ring. Due to the perpendicular orientation of elastic elements 42a, 42b, channels 50 have a greater extension here in the circumferential direction than do elastic elements 42a, 42b. Of course, elastic elements 42a, 42b may also have a greater extension in the circumferential direction than do channels 50.

As is also apparent in FIG. 2, elastic elements 42a, 42b are oriented in the flow direction of the main stream flowing through guide blade row 2. The main stream is indicated by arrow 52 and flows through channels 50 along particular inner shroud 14. In this case, it forms a sealing veil or sealing film which covers inner cavity 38 and which, so to speak, represents a rear elongation of inner shroud 14. In addition, a disturbance of the main flow is prevented or at least minimized by the slanted position of elastic elements 42a, 42b in the direction of the main stream or the main flow.

Figure 3:
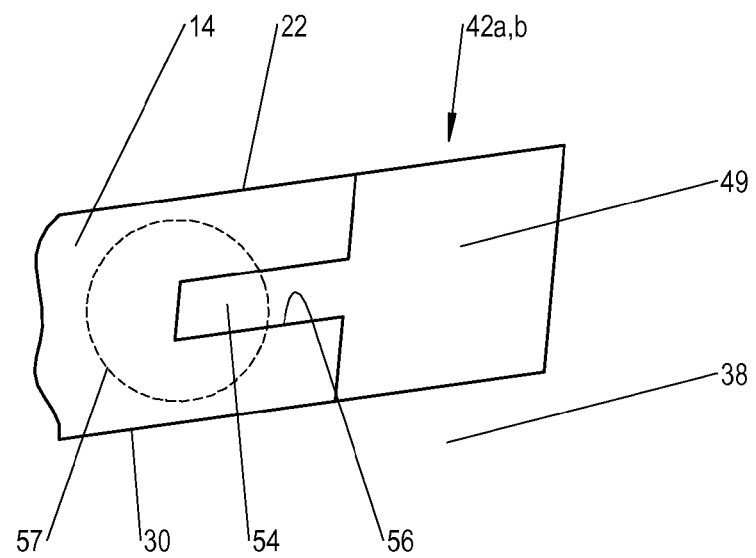
FIG. 3 shows a detailed representation of an elastic element of the annular space seal from FIG. 1.

As is shown in FIG. 3, elastic elements 42a, 42b have a central, stem-like holding section 54 for fastening to inner shrouds 14, which is inserted into a corresponding indentation 56 of inner shrouds 14. To secure elastic elements 42a, 42b in indentations 56, they may be additionally integrally secured on inner shrouds 14, for example with the aid of soldering, gluing, welding and the like. A fastening area 57 is preferably provided on the end side of holding section 54. In this exemplary embodiment, they gaplessly terminate with inner shrouds 14 with their active sections 49.

To prevent a swirl of the main stream boundary layer on inner shrouds 14, elastic elements 42a, 42b with their sheet-like active section 49 terminate here flush with shroud inner surfaces 22. Likewise, elastic elements 42a, 42b terminate flush with shroud outer surfaces 30 facing inner cavity 38. Elastic elements 42a, 42b thus have an extension in the radial direction of the turbomachine which is equal to a height of trailing shroud edge 48.

Figure 4:
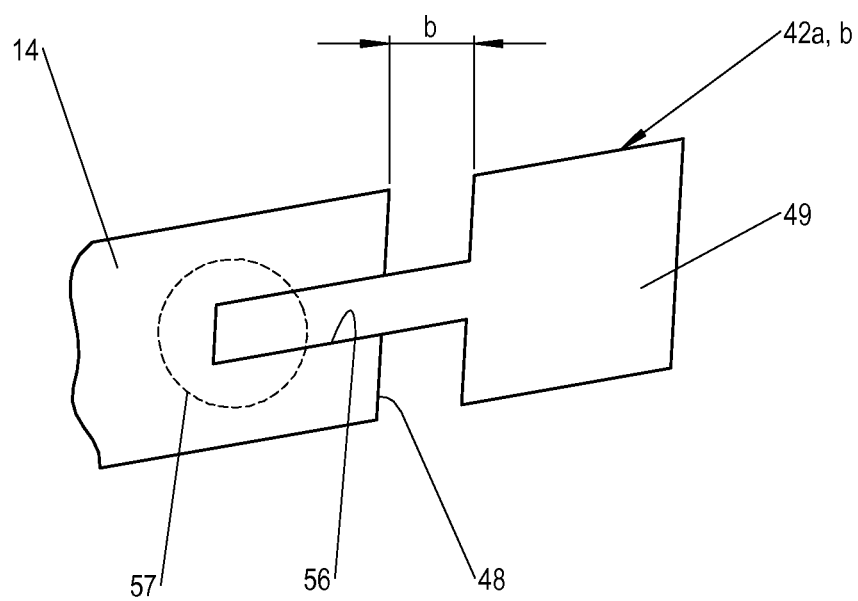
FIG. 4 shows a detailed representation of an alternative arrangement of an elastic element of the annular space seal from FIG. 1.

As outlined in FIG. 4 on the basis of elastic elements 42a, 42b, all elastic elements 42a, 42b, 44a, 44b, 60, 62 with their sheet-like active sections 49 may each also be spaced apart from shroud 14, 16 accommodating them by an axial gap b. A particular fastening area 57 in indentations 56 is preferably provided on the end, corresponding to their stem-like holding section 54. Gap b facilitates a greater coverage, since elastic elements 42a, 42b are able to bend to a greater degree in the circumferential direction.

With respect to FIG. 1, elastic elements 42a, 42b perform a protection function in addition to their sealing function during a relative axial displacement of the rotor with respect to the stator. Due to their spring action, after all, elastic elements 42a, 42b give way when they come into contact with moving blade areas. Axial gap a between guide blade row 2 and moving blade row 4 may have a minimal design, or elastic elements 42a, 42b may, in principle, even extend over inner platform 18 in the axial direction. A contact of this type may occur, for example, during a pump stroke, in which the rotor is pushed axially relative to the stator by an absolute amount. To protect the moving blade areas which run into elastic elements 42a, 42b in a situation of this type, the moving blades each have a rubbing area 58. It is situated between inner platform 18 and blade element 10 and thus outside the aerodynamic profile of the particular moving blade. Rubbing area 58 may additionally have a corresponding structure and/or hardened surface treatment.

As is furthermore apparent in FIG. 1, the annular space seal according to the present invention may also or alternatively be situated in the area of outer shrouds 16 of guide blade row 2. The annular space seal has corresponding rear, sheet-like elastic elements 60, which are provided with the same design as rear elastic elements 42a, 42b and which extend over an outer shroud outer edge 63. To form a large contact area during a relative axial displacement of the rotor with respect to the stator, corresponding rubbing areas 64 may be provided, as outlined on outer platform 20 of rear moving blade row 4. Rubbing areas 64 preferably extend as radial projections from platform outer surfaces 36 and form a flush rubbing surface 68 together with platform leading edges 66 or the trailing outer platform edges of the moving blades.

In addition to the rear radial inner and outer arrangement of the annular space seal according to the present invention, as explained above, the seal may alternatively or additionally also be positioned on leading shroud inner edges 70 and shroud outer edges 72, as shown in FIG. 1. As outlined in FIG. 3 on the basis of front elastic elements 44a, 44b, the geometry and orientation of sheet-like elastic elements 44a, 44b, 62 extend beyond shroud surfaces 22, 30 in the radial direction and in the flow direction of a main stream, corresponding to rear elastic elements 42a, 42b, 60. Similarly to rear rubbing areas 58, 64, the front moving blade row has corresponding rubbing areas, which are not outlined. In addition to a front inner and outer cavity coverage, the rotor is thus also protected against damage during a relative axial counter-movement.

A turbomachine is described, which includes an annular space seal for at least reducing a fluid exchange between an annular space, through which a main stream flows, and at least one cavity situated radially on the inside and/or radially on the outside of the annular space, the annular space seal having a plurality of sheet-like elastic elements, which are oriented in the radial direction of the turbomachine and in the flow direction of a main stream flowing through the particular guide blade row, and thereby acting as a protective device for the rotor and/or stator during a relative axial displacement with respect to the stator in addition to providing an improved cavity coverage. Sheet as used herein need not be exactly rectangular.

LIST OF REFERENCE NUMERALS

1 Turbomachine
2 Guide blade row
4 Moving blade row
8 Blade elements
10 Blade elements
12 Annular space
14 Inner shroud
16 Outer shroud
18 Inner platform
20 Outer platform
22 Shroud inner surface
24 Shroud inner surface
26 Platform inner surface
28 Platform inner surface
30 Shroud outer surface
32 Shroud outer surface
34 Platform outer surface
36 Platform outer surface
38 Inner cavity
40 Outer cavity
42a, b Elastic element
44a, b Elastic element
48 Shroud edge
49 Sheet-like active section
50 Channel
52 Main stream over shroud inner surface
54 Holding section
56 Indentation
57 Fastening area
58 Rubbing area
60 Elastic element
62 Elastic element
63 Shroud edge/shroud outer edge
64 Rubbing area
66 Platform edge/outer platform edge
68 Rubbing surface
70 Shroud edge/shroud inner edge
72 Shroud edge/shroud outer edge
a Axial gap
b Gap

What is claimed is:

1. A turbomachine comprising:
an annular space seal for the purpose of at least reducing a fluid exchange between an annular space, a main stream flowing through the annular space, and at least one cavity situated radially on an inside or radially on an outside of the annular space, the annular space seal having a plurality of sheet-shaped elastic elements, the elastic elements extending over shroud edges of a guide blade row in an axial direction of the turbomachine, the elastic elements being oriented in the radial direction of the turbomachine and in a flow direction of the main stream flowing through the guide blade row;
wherein the plurality of elastic elements are oriented axially and spaced apart circumferentially to define channels extending in the flow direction; and
wherein the channels are open in the radial direction.

2. The turbomachine as recited in claim 1 wherein the elastic elements are spaced evenly apart over the guide blade row in the circumferential direction of the turbomachine.

3. The turbomachine as recited in claim 1 wherein the elastic elements each terminate in the radial direction flush with a shroud inner side radially delimiting the annular space.

4. The turbomachine as recited in claim 1 wherein the elastic elements each terminate in the radial direction flush with a shroud outer side delimiting the cavity.

5. The turbomachine as recited in claim 1 wherein the elastic elements are each inserted into a corresponding indentation of shrouds via a holding section.

6. The turbomachine as recited in claim 1 wherein the elastic elements have active sections gaplessly terminating with shrouds.

7. The turbomachine as recited in claim 1 wherein the elastic elements have active sections each spaced apart from the shrouds by a gap.

8. The turbomachine as recited in claim 1 wherein the elastic elements are situated on leading and trailing shroud edges of a guide blade row.

9. The turbomachine as recited in claim 1 wherein moving blades opposite the elastic elements have rubbing areas for rubbing against the elastic elements, the rubbing areas each situated in a transitional area between an inner platform and a blade element.

10. The turbomachine as recited in claim 1 wherein moving blades opposite the elastic elements have rubbing areas for rubbing against the elastic elements, each rubbing area provided as radial, web projections of an outer platform edge.

11. The turbomachine as recited in claim 1 wherein the plurality of elastic elements extend so as to be slanted in the axial direction.

12. A turbomachine comprising:
  an annular space seal for the purpose of at least reducing a fluid exchange between an annular space, a main stream flowing through the annular space, and at least one cavity situated radially on an inside or radially on an outside of the annular space, the annular space seal having a plurality of sheet-shaped elastic elements, the elastic elements extending over shroud edges of a guide blade row in an axial direction of the turbomachine, the elastic elements being oriented in the radial direction of the turbomachine and in a flow direction of the main stream flowing through the guide blade row, wherein the elastic elements each terminate in the radial direction flush with a shroud outer side delimiting the cavity.

* * * * *